United States Patent [19]

Learn

[11] 4,051,668
[45] Oct. 4, 1977

[54] LINK CHAIN
[75] Inventor: Richard D. Learn, South River, N.J.
[73] Assignee: Duchess Mfg. Corporation, Hoboken, N.J.
[21] Appl. No.: 728,141
[22] Filed: Sept. 30, 1976
[51] Int. Cl.² ............................................. F16G 13/18
[52] U.S. Cl. ........................................................ 59/80
[58] Field of Search .................... 59/80, 82, 78, 84, 85; 63/4; 224/4 D, 4 H

[56] References Cited

U.S. PATENT DOCUMENTS

| 2,953,897 | 9/1960 | Pfisterer | 59/82 |
| 3,726,083 | 4/1973 | Pompeo | 59/85 |
| 3,857,237 | 12/1974 | Brauchi | 59/80 |
| 3,902,313 | 9/1975 | Poon | 59/80 |
| 3,930,364 | 1/1976 | Wong | 59/80 |

Primary Examiner—C.W. Lanham
Assistant Examiner—Gene P. Crosby
Attorney, Agent, or Firm—Kirschstein, Kirschstein, Ottinger & Frank

[57] ABSTRACT

A link chain to be used as a watch band, bracelet, or other item of jewelry. The chain includes a string of readily detachable link elements to permit the length of the chain to be quickly and easily adjusted, as desired, by removing or adding link elements at any point along the chain. Each link element consists of a journal link-half permanently hinged to an associated bearing link-half. The journal link-half of each link element includes a solid pintle having two ends, one end being constructed and arranged to be rotatably received in a permanently closed bearing and the other end being constructed and arranged to be rotatably received in a selectively openable bearing at an end of the bearing link-half of an immediately adjacent link element whereby to hingedly join the link elements. The selectively openable bearing has a manually operable closure shiftable between a first and a second position and biased to the first of these positions. In the first position, the closure bridges or caps a cradle to form a bearing so as to captively retain the other end of the pintle of the adjacent link element positioned in the bearing. Shifting the closure to a second position opens the bearing to allow the removal or insertion of the pintle to thereby detach or attach the adjacent link elements as desired.

7 Claims, 6 Drawing Figures

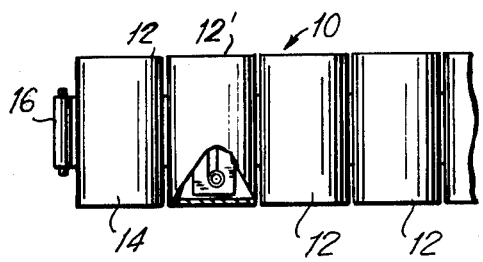
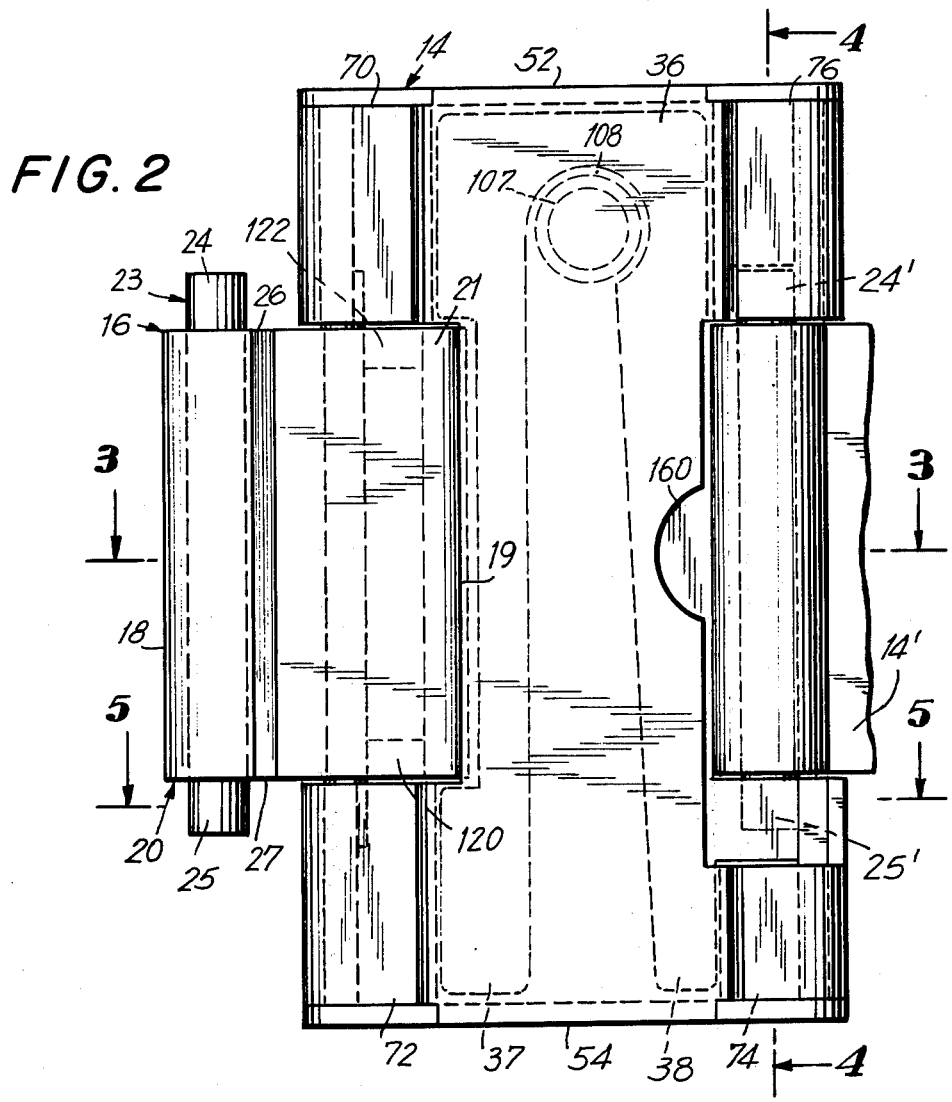
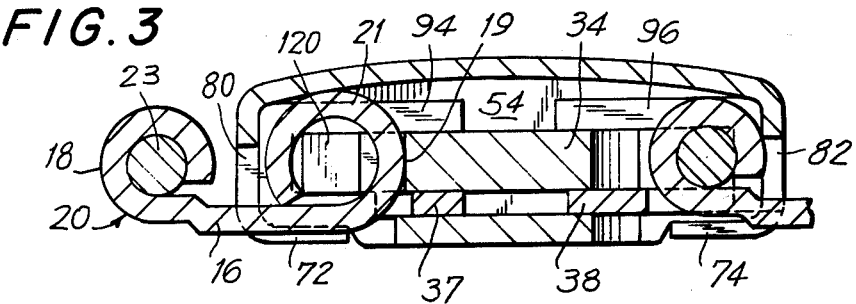

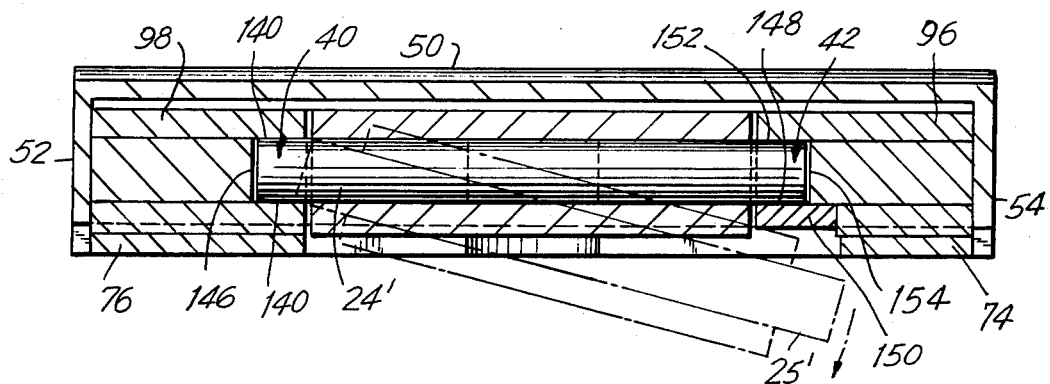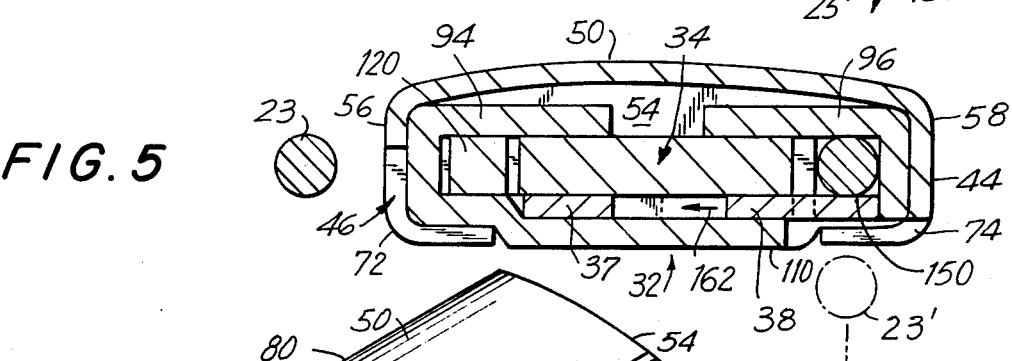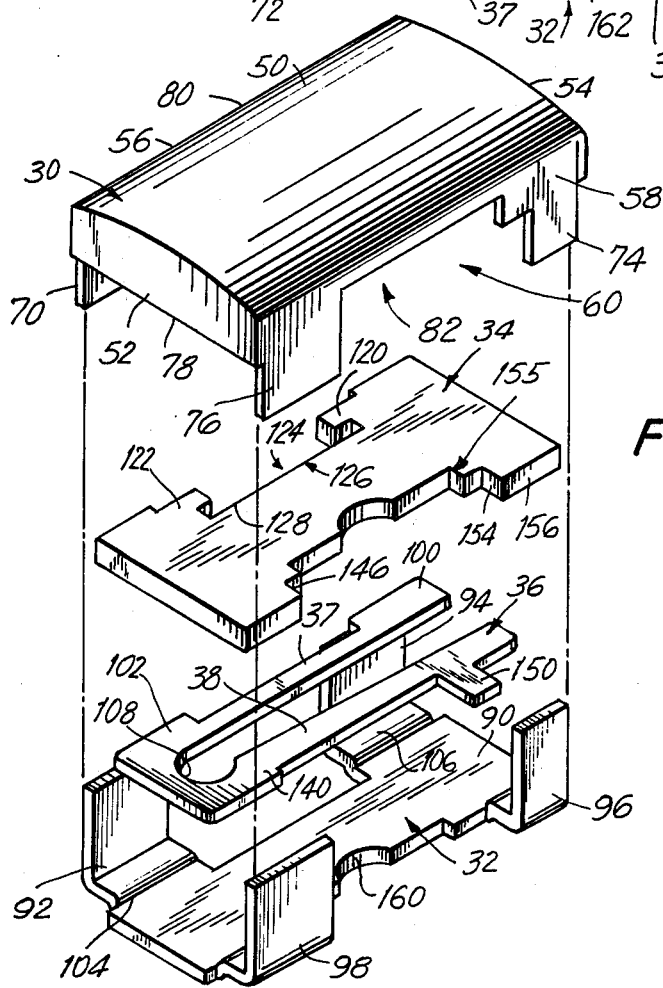

LINK CHAIN

BACKGROUND OF THE INVENTION

1. Field of the Invention

A flexible jewelry link chain and more particularly, a flexible jewelry link chain having readily removable or addable link elements.

2. Description of the Prior Art

In most conventional link chains, the link elements are permanently hinged to one another and require the time and expertise of a jeweler to take apart and reassemble hinges when the length of a chain is to be altered in order to fit a selected chain to a purchaser's wrist. Sometimes, to facilitate such alteration in length, one or more end link elements are specially designed to be readily detachable without the need for disassembling and reconstructing an as-sold permanent hinge.

One such construction utilizes pintles having retractable outwardly spring-loaded ends; however, these pintles are inherently weak, are made of several small parts and are considerably more expensive than solid pintles.

Another construction, as shown in U.S. Pat. No. 3,726,083, employs end links in which a link half has two bearings, one being closed and the other being closeable selectively by manually shifting a plate between two extreme positions. In one position, said bearing is an open cradle and, in the other, the bearing is closed, the plate remaining in either position to which it last is shifted. The other link half has two solid pintles. When one of the link elements is to be removed, the pintle link half is detached from the adjacent bearing link half after shifting the plate to open the bearing. Although such construction is rugged and aesthetically attractive, it requires manual movement of the plate in both directions first to open and thereafter to close the bearing, and it is susceptible to accidental opening of the chain if the plate is loose, is not fully closed or catches on an object.

SUMMARY OF THE INVENTION

1. Purposes of the Invention

An object of the present invention is to provide an adjustable improved link chain in which any one of the link elements in the chain can be removed readily.

Another object of the present invention is to provide an attractive, quickly and easily attachable/detachable link element that eliminates pintles with spring-based retractable ends.

A further object of the present invention is to provide a link chain in which the constituent link elements can be removed or added at any point in the chain to thereby shorten or lengthen the chain.

A still further object of the present invention is to provide a link chain which is rugged and reliable and does not require excessive service to maintain in a satisfactory condition while being aesthetically pleasing.

A yet further object of the present invention is to provide a link chain which enables all of the link elements in the chain to be detachably hinged together in a simple and inexpensive manner permitting flexing of the chain and insures that the link elements are normally positively retained, interconnected and held against separation but can be readily detached from one another.

A still further object of the present invention is to provide, during the manufacturing process, a means by which a bracelet can be assembled with or without the tube-end, i.e., the link which connects the watch to the watchband thereby allowing the end piece to be inserted after the watchband has been manufactured and assembled so that it can be fitted to a watch case at a later date without disassembly or modification of the completed watchband. The principle of the invention also applies to the center catch, clasp or fold-over buckle.

Other objects and advantages of the present invention in part will be obvious and in part will be pointed out in the following description.

2. Brief Description of the Invention

Generally, the above and other objects are accomplished by a link chain having readily detachable and attachable link elements in which each pair of adjacent link elements has two link halves which are permanently hinged to each other. One link-half, the journal link-half, has a solid pintle adjacent a transverse edge, i.e., an edge perpendicular to the longitudinal axis of the link element of the journal link-half remote from the permanent hinge. The other link-half, the bearing link-half, has at its end remote from the permanent hinge a permanently closed bearing and a selectively openable bearing adjacent a transverse edge, the two bearings being aligned and the permanently closed bearing having an open end facing the selectively openable bearing. Thus, the solid pintle and the bearings are at opposite ends of the link element with the permanent hinge disposed between them. A closure carried by the bearing link-half is mounted so that it can be shifted between a first position in which it closes a cradle to form the selectively openable bearing in which an end of the pintle is held captively and a second position in which the cradle is opened to permit removal or insertion of the other end of the pintle. The closure is resiliently biased to the first position whereby the bearing is maintained in closed condition and can be deliberately manually opened and manually held open to facilitate the insertion or removal of the other end of the pintle.

Adjacent link elements are joined by displacing the closure to its second position and positioning one end of the pintle in the permanently closed bearing. The link elements are manipulated while the closure is still in its second position, so that the other end of the pintle is inserted in the open cradle. The closure then is permitted to return to its first position thereby captively securing the link elements together.

Assembled link elements are separated by shifting the closure to its second position and manipulating the link elements until the other end of the pintle on the adjacent journal link-half is removed from the cradle. The one end of the pintle is then slid out of the permanently closed bearing and the closure is permitted to return to its first position. The two immediately adjacent link elements are now separated.

The invention consists in the features of construction, combinations of elements and arrangement of parts which will be exemplified in the link chain hereinafter described and of which the scope of patentability will be indicated in the appended claims.

BRIEF DESCRIPTION OF THE DRAWINGS

For a better understanding of the present invention, reference should be had to the accompanying drawings wherein like numerals of reference indicate similar parts throughout the several views and wherein:

FIG. 1 is a fragmentary top view of a chain embodying the present invention, the same being composed of a plurality of link elements and one of the bearing link-halves being shown in partial section;

FIG. 2 is an enlarged bottom view of one of the link elements and of a portion of the journal link-half of an adjacent link element;

FIG. 3 is a sectional view taken substantially along the line 3—3 of FIG. 2;

FIG. 4 is a sectional view taken substantially along the line 4—4 of FIG. 2, the pintle being shown in phantom as it appears when in the permanently closed bearing and out of the openable bearing;

FIG. 5 is a sectional view taken substantially along the line 5—5 of FIG. 2, the pintle being shown in phantom as it appears when out of the openable bearing; and FIG. 6 is an exploded view of a bearing link-half utilized in the link chain.

DESCRIPTION OF THE PREFERRED EMBODIMENT

Referring now in detail to the drawings, the flexible articulated linkage or link chain in accordance with the present invention is identified by the reference numeral 10 in FIG. 1. The link chain 10 is constructed from link elements 12 which are readily detachable from or attachable to one another in a manner which will hereinafter be described so that the length of the chain can be readily shortened or increased by removal or introduction of link elements at any location along the chain. The link elements 12 are hingedly interconnected for rotation about the axes perpendicular i.e. transverse, to the length of the chain. Each of the link elements 12 includes a bearing link-half 14 and a journal link-half 16 which are permanently hingedly connected to one another in a manner to be described more fully.

The construction of each link element 12 can best be understood with reference to FIGS. 2 and 3. The journal link half 16 has a first edge 18 and a second edge 19 both of which are transverse to the longitudinal axis of the chain. Each edge 18 and 19 is curled into a sleeve 20 and 21 respectively. Permanently positioned in the sleeve 20 is a solid pintle or rod 23 having its ends 24 and 25 extending outwardly from the sides 26 and 27 respectively of the journal link-half 16 so that the ends 24 and 25 may cooperate with aligned spaced bearing means in a next immediately adjacent bearing link-half of an immediately adjacent link element 12.

The bearing link-half 14 (FIGS. 5 and 6) includes a top shell 30 and a bottom shell 32 which encloses a panel or plate 34. Positioned between the plate 34 and the bottom shell 32 is a closure element 36 in the shape of a flat hairpin spring having tines 37 and 38. The bottom shell 32, the plate 34 and the closure element 36 fit together to form, functionally, a permanently closed bearing 40 having an open end facing a selectively openable bearing 42 (FIG. 4) in the bearing link-half along a third transverse edge 44. The plate 34 is also constructed and arranged to form a portion of a permanent hinge means joining the journal link-half 14 to the bearing link-half 16 of the same link element adjacent a fourth transverse edge 46.

The top shell 30, as shown in FIG. 6 and also in FIGS. 3, 4 and 5 is in the form of a shallow tray having an outwardly convex top surface 50 with end walls 52 and 54 which are parallel to the longitudinal axis of the length of the chain and side walls 56 and 58 which are transverse to the longitudinal axis of the length of the chain and which coincide with the transverse edges 46 and 44 respectively. The end walls and side walls extend downwardly from the top surface 50. The bottom 60 of the top shell 30 is open. The top surface 50 of the bearing link-half 14 may be of any desired configuration and may bear suitable decorations or ornamentation.

The side walls 56 and 58 have tabs 70 and 72, and 74 and 76 respectively extending therefrom which project beyond the bottom edges 78 of the end walls 52 and 54. Formed between the tabs 70 and 72 in the side wall 56 is a cutout 80 and formed between the tabs 74 and 76 in the side wall 58 is a cutout 82 which create passageways in the bearing link-half 12 when it is fully assembled to accommodate portions of the adjacent journal link-half.

The bottom shell 32 has a depressed central portion 90. It also has upwardly extending legs 92, 94, 96 and 98 at its corners which when bent into position (infolded) as best seen in FIG. 5 hold the plate 34 and the closure element 36 in place in the bottom shell.

To assemble the bearing link-half 14, the resilient closure element 36 is first positioned on the depressed central portion 90 so that the pads 100 and 102 on the tine 37 of the closure element 36 rest against the shoulders 104 and 106 formed where the legs 92 and 94 respectively join the depressed central portion 90 of the bottom shell 32. An similar arrangement is provided at the opposite edge of the element 36 at the bases of the tines 37, 38 so that the base of the closure element is secured in fixed position in the bearing link-half. The plate 34 is then placed on the closure element 36 and the legs 92, 94, 96 and 98 bent over (infolded) onto the top of the plate 34 to lock the plate 34 and the closure element 36 in place against the bottom shell 32. The top shell 30 is then slipped over the bottom shell 32 and the tabs 70, 72, 74 and 76 are bent onto the bottom shell 32, holding the bottom shell 32, the plate 34 and the closure element 36 within the top shell 30. The plate 34 may be provided with a post 107 that cooperates with a cutout 108 in the base of the closure element 36 to further secure the closure element 36 in the bearing link-half 14. As can best be seen in FIGS. 3 and 5, the legs 92, 94, 96 and 98 because they are offset or raised slightly from the bottom surface of the central portion 90, when the tabs 70, 72, 74 and 76 are bent onto the bottom shell 32, the tabs do not project beyond the bottom surface 110 of the bottom shell 32 to thereby reduce the possibility of their edges becoming entangled in the wearer's clothing or irritating the wearer's skin.

As mentioned hereinabove, the journal link-half 14 and the bearing link-half 16 which form the link element 12 are permanently hinged together and this is accomplished by providing opposed posts 120 and 122 in a recess 124 on the edge 126 of the plate 34 which is adjacent the fourth transverse edge 46 of the bearing link-half 16. The posts or protuberances 120 and 122 are constructed and arranged to be received in the opposite ends of the sleeve 21 adjacent the second transverse edge 19 on the journal link-half 16 as said sleeve is formed. The widths of the cutouts 80, 82 and the width of the recess 124 are slightly greater than the width of the journal link-half 16, and the protuberances 120 and 122 are spaced from the back wall 128 of the recess 124 sufficiently to permit the journal link-half 16 ample room for pivoting movement with respect to the bearing link-half 14. The pivotal connection is the permanent pivotal connection between the bearing link-half and the journal link-half of each chain link element.

As mentioned hereinabove, the bottom shell 32, the plate 34 and the spring closure 36 when joined together cooperate to form a permanently closed bearing 40 and a selectively openable bearing 42, with the end of the bearing 40 facing the bearing 42 being open. The permanently closed bearing 40, as can best be seen in FIG. 4 is formed between the top surface 140 of the closure element 36, the bottom surface 142 of the leg 98 when the leg is bent onto the plate 34 as hereinabove described and the vertical surface 146 on the plate 34 which serves as a wall closing one end of the bearing. The selectively openable bearing 42 is formed by the upper surface 148 of a tit or closure arm 150 on the tine 38 of the closure element 36, the bottom surface 152 of the leg 96, and the vertical surface 154 on the plate 34 serving as an end wall for the bearing. When the closure 150 is displaced inwardly into the body of the bearing link-half 16 as will hereinafter be described, a downwardly facing cradle is formed by the bottom surface 152 and the vertical surface 154. The vertical surfaces 146 and 154 are actually the side walls of a transverse recess 155 in the edge 156 of the panel 34 adjacent the third transverse edge 44 of the bearing link-half.

To assemble two separate link elements 12 and 12', the journal link-half 16 of one element 12 is brought adjacent the bearing link-half 14' of the immediately adjacent element 12'. FIGS. 3, 4 and 5 show in dotted lines a portion of the immediately adjacent link element 12' in various stages of joinder of the two link elements. By inserting a jeweler's pick (not shown) into the cutout 160 in the depressed central portion 90, the tine 38 of the closure element 36 can be urged inwardly in the direction of arrow 162 (FIG. 5). By so doing, the tit or closure arm 150 on the tine 38 is also urged inwardly thereby displacing the tit 150 from a first position in which it closes the bearing to a second position in which the bearing 42 is open to expose the cradle. The first transverse edge 18' of the bearing link-half 14' is then passed through the opening 82 in the journal link-half 16 and manipulated so that the end 24' of the pintle 23' is received endwise in the permanently closed bearing 40. The bearing link-half 14' is then rocked so that the end 25' of the pintle 23' slips transversely into the cradle formed by the surfaces 152 and 154. The jeweler's pick is then withdrawn from the cutout 160, releasing the tine 38 which snaps back to its normal condition so that the tit or closure arm 150 returns to its first position and again caps the cradle. In other words, the closure arm 150 is biased into the first position in which it caps or bridges the mouth of the cradle. The two adjacent link elements 12 and 12' are thereby hingedly connected.

To disassemble two adjacent previously assembled link elements 12 and 12', the above procedure is reversed. The jeweler's pick is inserted into the cutout 160 and the tine 38 urged in the direction of arrow 162, thereby causing the tit or closure arm 150 to move from the mouth of the selectively openable bearing 42, i.e., its first position opening the cradle. The journal link half 12' is then rocked so that the end 25' of the pintle 23' is removed from the cradle. The journal link-half 12' is then manipulated so that the end 24' of the pintle 23' is slipped endwise from the permanently closed bearing 40. The jeweler's pick is removed from the cutout 160 causing the tine 38 to return to its normal condition in which the tit 150 closes the mouth of the cradle.

In this manner, a link chain 10 is provided which is flexible, with link elements 12 being hingedly pivoted to and readily detachable from each other. Aesthetically, the chain 10 is attractive because there are no screws or side indentations, and the top of the chain is smooth. When used as a band for wrist watches, only the top and sides of the links elements 12 are visible. The bottom of each link element 12 is hidden because it faces the wrist of the wearer. If desired, the top of the bearing link-halves 16 may have suitable decorative designs thereon.

It can thus be seen that the objects of the present invention namely, to provide a flexible articulated link chain in which any one of the link elements can be removed readily is accomplished by providing a series of the aforesaid link elements which are hingedly interconnected. Alternately, only a few link elements of the described construction may be used at one or both ends of the chain and the remaining elements may be permanently and articulatedly joined. Each such detachable link element has a journal link-half and a bearing link-half. The journal link-half has a solid pintle mounted transverse to the axis of the link element with two ends projecting from the sides of the link element. The bearing link-half has a permanently closed bearing and a selectively openable bearing at its end remote from its associated journal link-half. The journal link-half and the bearing link-half are permanently hinged along their ends opposite the solid pintle and opposite the bearings respectively. The selectively openable bearing is created by a cradle and a closure carried by the bearing link-half that is mounted so that it can be shifted between a first position and a second position. In the first position, the closure closes the cradle to form the selectively openable bearing in which one end of the pintle of an immediately adjacent link-half can be captively held. In the second position, the closure opens the selectively openable bearing so that the end of the pintle of the immediately adjacent link element can be removed or inserted into the cradle. The closure is biased to the first position.

Adjacent link elements are joined by displacing the closure to its second position against the bias and inserting one end of the pintle of the immediately adjacent link element in the permanently closed bearing. The link elements are manipulated so that the other end of the pintel is slipped transversely into the open cradle. The closure then is released to allow the bias to return it to its first position thereby captively securing the link elements together. To separate two adjacent link elements, the procedure is reversed. The closure is shifted to its second position against the bias and the link elements manipulated so that the end of the pintle is removed transversely from the now open cradle. The other end of the pintle is then removed lengthwise from the permanently closed bearing and the closure permitted to return to its first position.

While in accordance with the patent statutes a preferred embodiment of the present invention has been illustrated and described in detail, it is to be particularly understood that the invention is not limited thereto or thereby.

What is claimed is:

1. A flexible articulated linkage comprising a plurality of link elements pivotably interconnected in a chain, at least, one of said link elements including a journal link-half and a bearing link-half, said journal link-half having a first and a second transverse edge, said journal link-half having a pintle mounted thereon transverse to the longitudinal axis of said chain and situated adjacent said first transverse edge, said pintle having two ends, said bearing link half having a third and a fourth transverse edge, a permanently closed bearing and a selectively openable bearing aligned therewith and spaced therefrom and situated adjacent said third transverse edge, said permanently closed bearing pivotably receiving endwise one end of the pintle of a next adjacent link element, said selectively openable bearing transversely releasably receiving the other end of said pintle of the next adjacent link element, means biasing said openable bearing to a closed condition and means adjacent said second transverse edge of said journal link-half and said fourth transverse edge of said bearing link-half permanently hingedly connecting said journal link-half to said bearing link-half.

2. A flexible articulated linkage including a plurality of pivotably interconnected link elements, at least one of said link elements comprising:
   a. a journal link-half having a first and a second transverse edge;
   b. a pintle adjacent said first transverse edge and transverse to the longitudinal axis of said articulated linkage, said pintle having two ends;
   c. a bearing link-half having a third transverse edge and fourth transverse edge;
   d. a permanently closed bearing adjacent said third transverse edge;
   e. a selectively openable bearing adjacent said third transverse edge including:
      i. a cradle having an open side;
      ii. a closure having a first position and a second position, said closure in said first position bridging said cradle, and in said second position opening said cradle; and
      iii. means for biasing said closure into said first position;
   said permanently closed bearing having an open end facing said selectively openable bearing;
   g. said permanently closed bearing said said selectively openable bearing constructed and arranged to receive the opposite ends of a pintle of an immediately adjacent journal link-half to thereby hingedly interconnect two adjacent link elements; and
   h. hinger means adjacent said first transverse edge of said journal link-hlaf and said fourth transverse edge of said bearing link-half constructed and arranged to permanently hingedly interconnect said journal link-half and said bearing link-half.

3. the flexible articulated linkage in accordance with claim 2 wherein said hinge means comprises:
   a. a sleeve adjacent said second transverse edge of said journal link-half; and
   b. opposed protuberances adjacent said fourth transverse edge of said bearing link-half, said protuberances permanently received within opposite ends of said sleeve to pivotally connect said journal link-half to said bearing link-half.

4. The flexible articulated linkage in accordance with claim 2 wherein the bearing link-half includes a top shell, a bottom shell, said shells being internestable to define a hollow interior, means to retain said shells in internested condition. said bottom shell having a pocket, a flat hairpin spring captive in said pocket, a plate overlying said spring, said bottom shell having an opening, said plate and said bottom shell defining said cradle, said opening constituting the open side of said cradle, one arm of said spring having a portion closing said opening and constituting said closure said one arm being biased to cradle closing position and being manually deflectable to cradle opening position.

5. A flexible articulated linkage in accordance with claim 2 wherein the bearing link-half includes a member having an opening therein forming said openside of said cradle, said member including a pocket adjacent said member, a flat hairpin spring in said pocket, means captively holding said spring in said pocket, one arm of said spring having a portion closing said opening and constituting said closure, said one arm being biased to cradle closing position and being manually deflectable to cradle opening position.

6. The flexible articulated linkage in accordance with claim 5 wherein the base of said spring is anchored in said pocket.

7. The flexible articulated linkage in accordance with claim 6 wherein a securing means on the pocket and the other arm of said spring inhibit movement of said other arm away from said one arm when said one arm is deflected to cradle opening position.

* * * * *